United States Patent
Wang

(10) Patent No.: US 11,528,154 B2
(45) Date of Patent: Dec. 13, 2022

(54) CONTROL METHOD, POWERED DEVICE, AND SYSTEM

(71) Applicant: Huawei Technologies Co., Ltd., Shenzhen (CN)

(72) Inventor: Haifei Wang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 87 days.

(21) Appl. No.: 17/138,219

(22) Filed: Dec. 30, 2020

(65) Prior Publication Data

US 2021/0119813 A1 Apr. 22, 2021

Related U.S. Application Data

(63) Continuation of application No. PCT/CN2019/117269, filed on Nov. 11, 2019.

(30) Foreign Application Priority Data

Nov. 12, 2018 (CN) .......................... 201811341257.8

(51) Int. Cl.
*H04L 12/10* (2006.01)

(52) U.S. Cl.
CPC .................................. *H04L 12/10* (2013.01)

(58) Field of Classification Search
CPC ........... H04L 12/10; H04L 25/02; H04N 1/32; H04N 1/327; H04N 1/32704; H04N 1/32763; H04B 2203/54; H04B 2203/5462; H04B 2203/547; H04B 2203/5483; H04B 2203/5487

See application file for complete search history.

(56) References Cited

U.S. PATENT DOCUMENTS

| | | | | |
|---|---|---|---|---|
| 6,968,466 B2 * | 11/2005 | Bolian | ...................... | G06F 1/26 323/299 |
| 7,492,059 B2 * | 2/2009 | Peker | .................... | H04L 49/351 307/71 |
| 7,627,398 B1 * | 12/2009 | Bennett | .................... | H04L 12/10 700/297 |
| 7,898,406 B2 * | 3/2011 | Darshan | .................. | H04L 69/24 700/297 |
| 7,940,787 B2 * | 5/2011 | Karam | .................... | H04L 12/10 370/463 |
| 8,207,635 B2 * | 6/2012 | Covaro | .................. | H04B 3/542 307/154 |
| 8,549,331 B2 * | 10/2013 | Karam | ...................... | H04L 1/22 713/340 |
| 8,595,516 B2 * | 11/2013 | Panguluri | ............... | G06F 1/266 713/340 |

(Continued)

FOREIGN PATENT DOCUMENTS

| | | |
|---|---|---|
| CN | 203632689 U | 6/2014 |
| CN | 104869002 A | 8/2015 |

(Continued)

*Primary Examiner* — James M Perez

(74) *Attorney, Agent, or Firm* — Conley Rose, P.C.

(57) ABSTRACT

A control method includes entering, by a powered device, a first status, controlling, by the powered device, at least one of a plurality of first loads in the powered device to be in a connected state, and controlling, by the powered device, a second load in the powered device to be in a disconnected state.

22 Claims, 5 Drawing Sheets

(56) References Cited

U.S. PATENT DOCUMENTS

| | | | | |
|---|---|---|---|---|
| 8,892,915 B2* | 11/2014 | Hua | H04L 12/10 | 713/323 |
| 8,943,344 B2* | 1/2015 | Giat | H04L 12/4625 | 713/320 |
| 9,026,809 B2* | 5/2015 | Paul | G06F 1/26 | 713/320 |
| 9,501,117 B2* | 11/2016 | Ma | H04L 12/10 | |
| 10,027,494 B2* | 7/2018 | Yang | H04L 12/10 | |
| 10,057,074 B2* | 8/2018 | Zhuang | H04L 12/10 | |
| 10,466,768 B2* | 11/2019 | Fu | G06F 1/266 | |
| 10,511,601 B2* | 12/2019 | Huang | H04L 67/06 | |
| 10,564,697 B2* | 2/2020 | Yuan | G06F 1/266 | |
| 10,594,229 B2* | 3/2020 | Cao | H01R 13/6675 | |
| 10,594,367 B1* | 3/2020 | Bhagwat | H02J 1/00 | |
| 10,680,836 B1* | 6/2020 | Sironi | H02M 1/32 | |
| 10,819,124 B2* | 10/2020 | Li | H02J 7/007184 | |
| 10,887,117 B2* | 1/2021 | Cao | H04L 12/10 | |
| 11,063,774 B2* | 7/2021 | Sironi | H02M 7/06 | |
| 11,082,243 B2* | 8/2021 | Wendt | H04L 12/40045 | |
| 2004/0230846 A1* | 11/2004 | Mancey | H04L 12/10 | 713/300 |
| 2005/0243861 A1* | 11/2005 | Elkayam | H04L 12/10 | 713/300 |
| 2006/0092000 A1* | 5/2006 | Karam | H04L 12/44 | 713/300 |
| 2006/0164098 A1* | 7/2006 | Su | H04L 12/10 | 324/534 |
| 2006/0212724 A1* | 9/2006 | Dwelley | H04L 12/10 | 713/300 |
| 2007/0003053 A1* | 1/2007 | Mathoorasing | H04M 19/008 | 379/413 |
| 2007/0085675 A1* | 4/2007 | Darshan | H04L 12/10 | 307/3 |
| 2007/0135086 A1* | 6/2007 | Stanford | H04L 12/10 | 370/402 |
| 2007/0136614 A1* | 6/2007 | Heath | H04L 12/10 | 713/300 |
| 2008/0005600 A1* | 1/2008 | Diab | G06F 1/3209 | 713/300 |
| 2008/0175260 A1* | 7/2008 | Hussain | H04L 12/66 | 370/419 |
| 2008/0276104 A1* | 11/2008 | Hussain | G06F 1/266 | 713/300 |
| 2009/0083552 A1* | 3/2009 | Hussain | H04L 12/10 | 713/300 |
| 2010/0042855 A1* | 2/2010 | Karam | G06F 1/26 | 713/300 |
| 2010/0049998 A1* | 2/2010 | Karam | H04L 12/10 | 713/300 |
| 2010/0106985 A1* | 4/2010 | Panguluri | G06F 1/266 | 713/300 |
| 2010/0213759 A1* | 8/2010 | Covaro | H04B 3/542 | 307/1 |
| 2011/0133551 A1* | 6/2011 | Moller | H04L 12/10 | 307/11 |
| 2012/0246458 A1* | 9/2012 | Jain | G06F 1/3287 | 713/100 |
| 2013/0049469 A1* | 2/2013 | Huff | G06F 1/266 | 307/62 |
| 2013/0103958 A1* | 4/2013 | Hua | H04L 12/10 | 713/310 |
| 2013/0111245 A1* | 5/2013 | Giat | H04L 12/10 | 713/323 |
| 2014/0084691 A1* | 3/2014 | Ranzato | H04L 12/10 | 307/60 |
| 2014/0129850 A1* | 5/2014 | Paul | H04L 12/10 | 713/300 |
| 2015/0035365 A1* | 2/2015 | Picard | H02J 7/00 | 307/39 |
| 2015/0091391 A1* | 4/2015 | Dwelley | H02J 3/00 | 307/130 |
| 2015/0094868 A1* | 4/2015 | Diab | G05B 19/4185 | 700/286 |
| 2015/0145324 A1* | 5/2015 | Heath | H04L 12/40045 | 307/1 |
| 2016/0056967 A1* | 2/2016 | Ohana | H04L 12/10 | 307/1 |
| 2016/0142217 A1* | 5/2016 | Gardner | B60L 3/0069 | 307/1 |
| 2016/0269187 A1* | 9/2016 | Zhuang | H04L 12/10 | |
| 2017/0041153 A1* | 2/2017 | Picard | H04L 12/10 | |
| 2017/0085192 A1* | 3/2017 | Agnes | H02M 7/217 | |
| 2017/0235358 A1* | 8/2017 | Fu | H04L 12/40182 | 713/323 |
| 2017/0264614 A1* | 9/2017 | Huang | H04L 67/06 | |
| 2018/0052504 A1* | 2/2018 | Wendt | G06F 1/24 | |
| 2018/0323981 A1* | 11/2018 | Zhuang | H04L 12/10 | |
| 2018/0375673 A1* | 12/2018 | Wendt | H04L 12/10 | |
| 2019/0356497 A1* | 11/2019 | Ji | H02J 1/08 | |
| 2020/0145238 A1* | 5/2020 | Wendt | H04L 12/40045 | |
| 2020/0204382 A1* | 6/2020 | Lagrange | H04L 12/40039 | |
| 2020/0274725 A1* | 8/2020 | Sironi | H01H 83/22 | |
| 2020/0358368 A1* | 11/2020 | Gardner | H04L 12/10 | |
| 2020/0358625 A1* | 11/2020 | Lagrange | H04L 12/40045 | |
| 2021/0119813 A1* | 4/2021 | Wang | H04L 12/10 | |
| 2021/0408802 A1* | 12/2021 | Gu | G06F 1/266 | |
| 2022/0060343 A1* | 2/2022 | Zhu | H04L 12/10 | |

FOREIGN PATENT DOCUMENTS

| | | |
|---|---|---|
| CN | 104954145 A | 9/2015 |
| CN | 106034032 A | 10/2016 |
| CN | 106341237 A | 1/2017 |
| CN | 106953734 A | 7/2017 |
| CN | 108111316 A | 6/2018 |
| GB | 2462312 A | 2/2010 |
| WO | 2007106795 A2 | 9/2007 |
| WO | 2016188823 A1 | 12/2016 |
| WO | 2017017546 A2 | 2/2017 |

\* cited by examiner

CONTROL METHOD, POWERED DEVICE, AND SYSTEM

CROSS-REFERENCE TO RELATED APPLICATIONS

This application is a continuation of International Patent Application No. PCT/CN2019/117269 filed on Nov. 11, 2019, which claims priority to Chinese Patent Application No. 201811341257.8 filed on Nov. 12, 2018. The disclosures of the aforementioned applications are hereby incorporated by reference in their entireties.

TECHNICAL FIELD

Embodiments of the present disclosure relate to the field of power over Ethernet, and in particular, to a control method, a powered device, and a system.

BACKGROUND

In a single-pair power over Ethernet system, power sourcing equipment (PSE) provides a data signal and a power signal for a powered device using one pair of twisted pairs. Referring to a power level detection procedure shown in FIG. 1B, the PSE detects a power level of the powered device using a Serial Communication Classification Protocol (SCCP), and then the PSE provides a corresponding working voltage for the powered device based on the detected power level.

However, the applicant finds that a process of detecting a power level of user equipment using the SCCP is as follows. A message is exchanged between a data transceiver of the PSE and a data transceiver of the powered device to learn the power level. In a message transmission process, modulation and demodulation need to be performed. The exchange process needs to be completed in a plurality of clock cycles, and it takes hundreds of milliseconds (ms) for the powered device to detect a power level of the PSE. Consequently, a requirement for fast startup cannot be met.

SUMMARY

To resolve a technical problem, this application provides a control method, a powered device, and a system, to detect a power level of a powered device by hardware. In this way, a time consumed for power level detection is greatly reduced.

According to a first aspect, this application provides a control method, including A powered device enters a first status, and the powered device controls at least one of one or more first loads in the powered device to be in a connected state and a second load in the powered device to be in a disconnected state. The powered device may be a device that receives power. The powered device includes the one or more first loads and the second load. The first load and the second load are devices that consume electric energy in a circuit. The first load and the second load may be inductive loads, capacitive loads, resistive loads, or a combination of the foregoing three load types. This is not limited in this application. A connection relationship between the one or more first loads may be a series connection, a parallel connection, or a hybrid connection. This is not limited in this application. The first load is configured to detect a power level of the powered device, and the second load is a working load of the powered device. The connected state indicates a status in which the load is connected to the circuit to consume electric energy of PSE. The disconnected state indicates a status in which the load is not connected to the circuit to consume the electric energy of the PSE. The PSE may be a device that supplies power. The PSE loads an output voltage to the at least one first load to form a current, and the PSE may determine the power level of the powered device by detecting intensity of the current. In this way, the power level of the powered device is detected by hardware, and the power level of the powered device does not need to be learned through message exchange. Therefore, a time consumed for modulation and demodulation in a message transmission process is avoided, and a time for determining the power level of the powered device is greatly reduced.

In a possible design, in a part of a time in which the at least one first load is in the connected state, the second load in the powered device is in the disconnected state. A length of the part of the time may be preconfigured based on a requirement. This is not limited in this application. For example, if total duration in which the first load is in the connected state is 5 ms, in 4.5 ms in which the first load is in the connected state, the second load is in the disconnected state. In the remaining 0.5 ms, the first load is in the connected state, and the second load is also in the connected state.

In a possible design, the one or more first loads are all hierarchical loads. The hierarchical load includes one or more of a resistor, a capacitor, an inductor, a field-effect transistor, and a transistor.

In a possible design, the first status is a power level detection state, and the power level detection state is used to detect the power level of the powered device. The first status corresponds to a time interval. A reference moment of the time interval may be a moment at which the powered device is electrically connected to the PSE, and the moment is used as a zero moment. The power level is also referred to as any one of a power class, a classification signature, a power value, a power range, a power consumption value, a power consumption range, an energy consumption value, an energy consumption range, a power table, and an energy consumption table.

In a possible design, at any moment at which the powered device is in the first status, a quantity of at least one first load is less than a quantity of one or more first loads.

In a possible design, before the powered device enters the first status, the method further includes when the powered device detects that a first condition is met, it is determined, based on a detection result, that a current status is the first status. The first condition is a condition for entering the first status.

In a possible design, the first condition includes at least one of the following.

A voltage output by the PSE to the powered device is greater than or equal to a first voltage threshold, duration in which a voltage output by the PSE to the powered device is greater than or equal to a second voltage threshold is greater than or equal to first duration, a voltage output by the PSE to the powered device falls within a first voltage range, duration in which a voltage output by the PSE to the powered device falls within a second range is greater than or equal to second duration, a current output by the PSE to the powered device is greater than or equal to a first current threshold, duration in which a current output by the PSE to the powered device is greater than or equal to a second current threshold is greater than or equal to third duration, a current output by the PSE to the powered device falls within a first current range, duration in which a current output by the PSE to the powered device falls within a second current range is greater than or equal to fourth duration, duration in which the powered device is in the first status is greater than or equal to fifth duration, or an indication signal sent by the PSE is received, where the indication signal is used to instruct the powered device to enter the first status.

In a possible design, the method further includes the following.

The powered device enters a second status. In the second status, the second load is in the connected state.

In a possible design, the method further includes the following.

The powered device controls the one or more first loads in the powered device to be in the disconnected state.

In a possible design, before the powered device enters the second status, the method further includes the following.

When the powered device detects that a second condition is met, it is determined, based on a detection result, that the current status is the second status.

In a possible design, the second condition includes at least one of the following.

The voltage output by the PSE to the powered device is greater than or equal to a third voltage threshold, duration in which the voltage output by the PSE to the powered device is greater than or equal to a fourth voltage threshold is greater than or equal to sixth duration, the voltage output by the PSE to the powered device falls within a third voltage range, duration in which the voltage output by the PSE to the powered device falls within a fourth voltage range is greater than or equal to seventh duration, the current output by the PSE to the powered device is greater than or equal to a third current threshold, duration in which the current output by the PSE to the powered device is greater than or equal to a fourth current threshold is greater than or equal to eighth duration, the current output by the PSE to the powered device falls within a third current range, duration in which the current output by the PSE to the powered device falls within a fourth current range is greater than or equal to ninth duration, duration in which the powered device is in the first status is greater than or equal to tenth duration, or an indication signal sent by the PSE is received, where the indication signal is used to instruct the powered device to enter the second status.

According to a second aspect, this application provides a powered device, including a controller, one or more first loads, and a second load. The controller is configured to control the apparatus to enter a first status, and the controller is further configured to control at least one of the one or more first loads in the powered device to be in a connected state and the second load in the powered device to be in a disconnected state.

In a possible design, in all or a part of a time in which the at least one first load is in the connected state, the second load in the powered device is in the disconnected state.

In a possible design, the one or more first loads are hierarchical loads.

In a possible design, the first status is a power level detection state.

In a possible design, at any moment at which the powered device is in the first status, a quantity of first loads in the connected state is less than or equal to a quantity of first loads.

In a possible design, the controller is further configured to when the powered device detects that a first condition is met, determine, based on a detection result, that a current status is the first status.

In a possible design, the first condition includes at least one of the following.

A voltage output by PSE to the powered device is greater than or equal to a first voltage threshold, duration in which a voltage output by PSE to the powered device is greater than or equal to a second voltage threshold is greater than or equal to first duration, a voltage output by PSE to the powered device falls within a first voltage range, duration in which a voltage output by PSE to the powered device falls within a second voltage range is greater than or equal to second duration, a current output by PSE to the powered device falls within a first current range, duration in which a current output by PSE to the powered device falls within a second current range is greater than or equal to fourth duration, duration in which the powered device is in the first status is greater than or equal to fifth duration, or an indication signal sent by PSE is received, where the indication signal is used to instruct the powered device to enter the first status.

In a possible design, the controller is further configured to control the powered device to enter a second status. In the second status, the second load is in the connected state.

In a possible design, the controller is further configured to control the one or more first loads in the powered device to be in the disconnected state.

In a possible design, the controller is further configured to when it is detected that a second condition is met, determine, based on a detection result, that the current status is the second status.

In a possible design, the second condition includes at least one of the following.

The voltage output by the PSE to the powered device is greater than or equal to a fourth voltage threshold, duration in which the voltage output by the PSE to the powered device is greater than or equal to a fourth voltage threshold is greater than or equal to sixth duration, the voltage output by the PSE to the powered device falls within a third voltage range, duration in which the voltage output by the PSE to the powered device falls within a fourth voltage range is greater than or equal to seventh duration, the current output by the PSE to the powered device is greater than or equal to a third current threshold, duration in which the current output by the PSE to the powered device is greater than or equal to a fourth current threshold is greater than or equal to eighth duration, duration in which the current output by the PSE to the powered device falls within a fourth current range is greater than or equal to ninth duration, duration in which the powered device is in the first status is greater than or equal to tenth duration, or an indication signal sent by the PSE is received, where the indication signal is used to instruct the powered device to enter the second status.

According to a third aspect, this application further provides a power over Ethernet system. The power over Ethernet system includes the powered device and the PSE in any possible implementation of the second aspect. The powered device is a device that receives power, and the PSE is a device that supplies power. The PSE outputs a voltage or a current to the powered device using a network cable. The powered device detects, using the network cable, the voltage or the current output by the PSE. When the powered device enters a first status, the powered device controls at least one of one or more first loads in the powered device to be in a connected state and a second load in the powered device to be in a disconnected state.

DESCRIPTION OF EMBODIMENTS

To reduce a time consumed by PSE to detect a power level of a powered device in a single-pair power over Ethernet system, this application provides a power level control method and a related device. The method and the device are based on a same concept. Problem-resolving principles of the method and the device are similar. Therefore, mutual reference may be made to implementation of the method and the device, and no repeated description is provided.

Figure 1A:
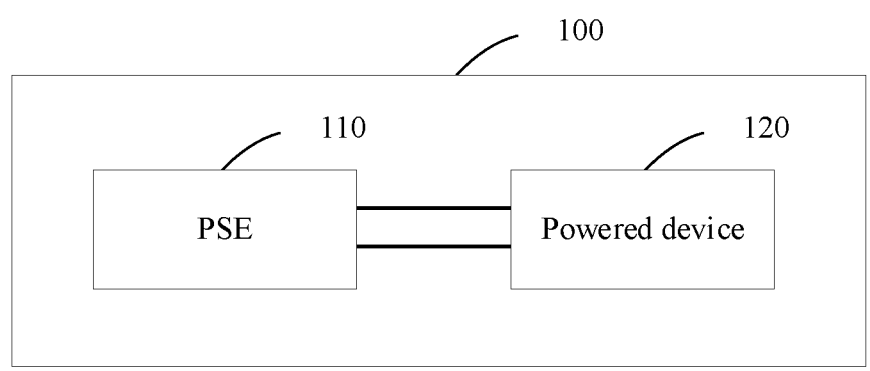
FIG. 1A is a schematic structural diagram of a single-pair power over Ethernet system according to an embodiment of the present disclosure.

This application provides a power level control method and a communications device, and the control method and the communications device are applied to a single-pair power over Ethernet system. The power over Ethernet system includes a powered device and PSE. For example, as shown in FIG. 1A, a power over Ethernet system 100 includes PSE 110 and a powered device 120. The PSE 110 is connected to the powered device 120 using an Ethernet cable (for example, a twisted pair). The PSE 110 superimposes electric energy on the Ethernet cable for use by the powered device 120, and is further responsible for monitoring and managing a working status of the connected powered device 120. One piece of PSE 110 may be connected to one or more powered devices 120. The powered device 120 is a device that receives power over Ethernet, obtains electric energy and data that are transmitted by the PSE 110 using the Ethernet cable, and sends data to the PSE 110 using the Ethernet cable.

Further, the PSE 110 may be a switch, a hub, a router, or the like. The powered device 120 may be a wireless access point (AP), a camera, an Internet Protocol (IP) phone, a smart speaker, a smart light, a manipulator, a smart charger, or the like.

Figure 1B:
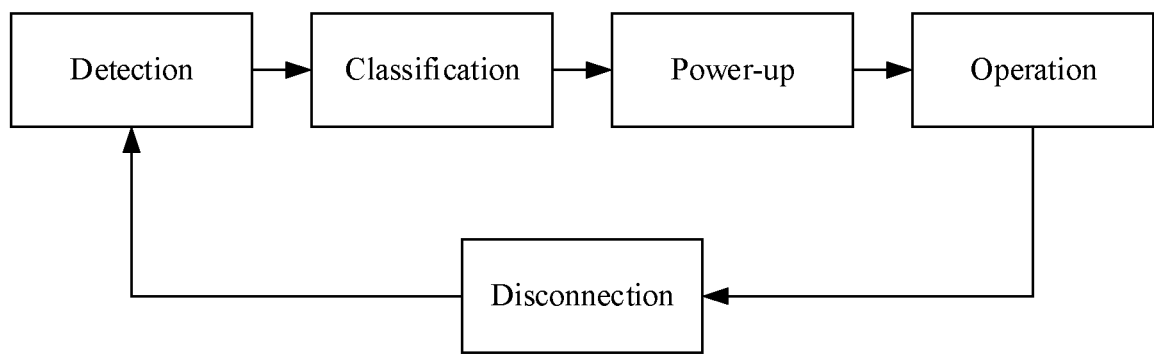
FIG. 1B is a schematic flowchart of a power level detection method according to an embodiment of the present disclosure.

As shown in FIG. 1B, a power over Ethernet process includes five working statuses: detection, classification, power-up, operation, and disconnection. Classification is an optional process, as shown in FIG. 1B. Detection is a process in which the PSE 110 identifies the connected powered device 120, and detects validity of the powered device 120, to determine whether to supply power to the powered device 120. When determining that the powered device 120 is valid, the PSE 110 may continue to detect a power level of the powered device 120, and supply power to the powered device 120 based on the power level of the powered device 120. The powered device 120 enters a power-up process and can work normally. Alternatively, when determining that the powered device 110 is valid, the PSE 110 may directly supply power to the powered device 120 based on default power. The powered device 120 enters a power-up phase and can work normally. When the powered device 120 is disconnected from a network, the PSE 110 quickly stops supplying power to the powered device 120, and repeats the detection process. In the embodiments of this application, the classification state in the foregoing five working statuses is also referred to as a power level detection state. This is not limited in the present disclosure.

In the embodiments of this application, a power level detection process in the single-pair power over Ethernet system is mainly improved. However, it should be understood that the powered device 120 provided in the embodiments of this application may be a complete powered device, and has a structure of a known powered device. Only a component related to power level detection in the powered device 120 is described herein, and another component is not described. Alternatively, the powered device 120 provided in the embodiments of this application may be a component of a powered device, and in particular, may be a component related to power level detection. Alternatively, the powered device 120 provided in the embodiments of this application may be a component associated with a powered device, and in particular, may be a component related to power level detection. This is not limited in the present disclosure.

In addition, it should be understood that in description of this application, "a plurality of" means "two or more". Words such as "first" and "second" are used only for distinguishing between description, and cannot be understood as an indication or implication of relative importance, or cannot be understood as an indication or implication of a sequence.

Figure 2:
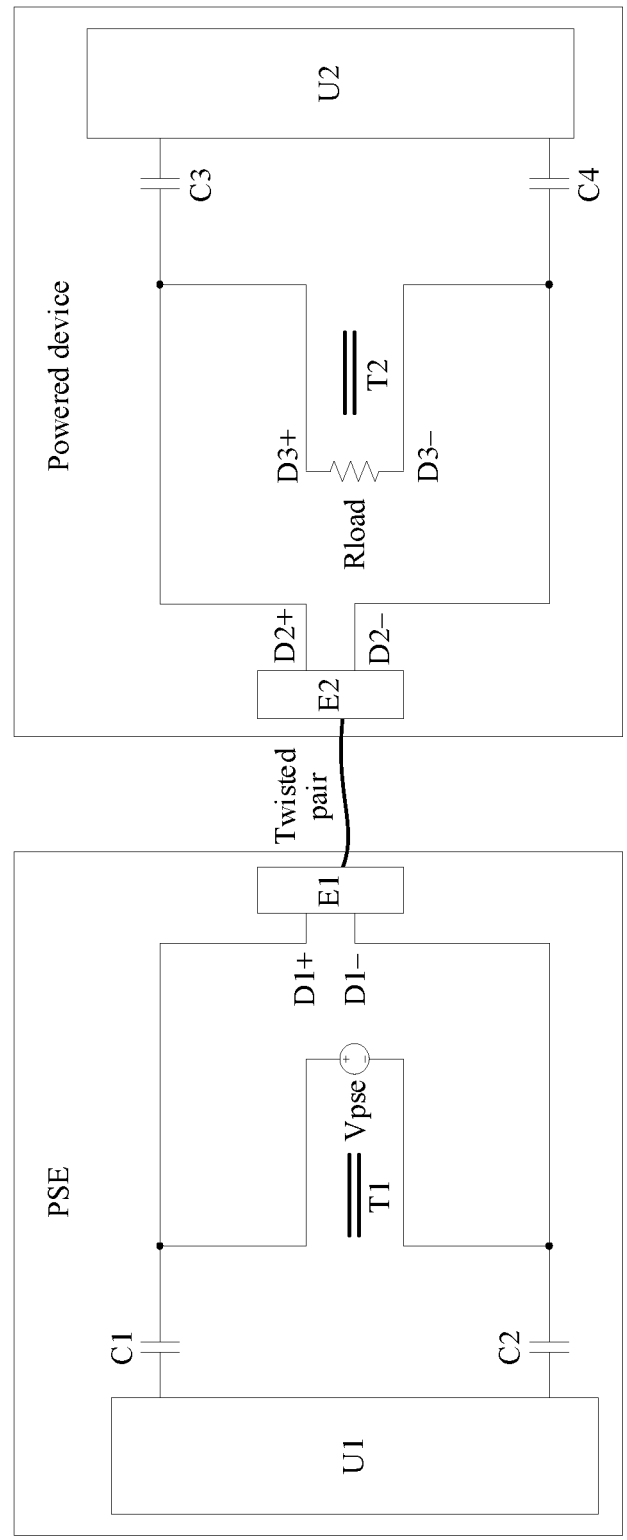
FIG. 2 is a schematic structural diagram of PSE and a powered device in a single-pair power over Ethernet system according to an embodiment of the present disclosure.

FIG. 2 is a schematic structural diagram of a single-pair power over Ethernet system. PSE supplies power to a powered device using one pair of cables. For example, the powered device is connected to the PSE using a twisted pair. A type of the twisted pair is not limited in this embodiment of the present disclosure. The powered device supplies power to the powered device using two conducting wires in the twisted pair. The twisted pair may be any one of a category 1 cable, a category 2 cable, a category 3 cable, a category 4 cable, a category 5 cable, a category 6 cable, a category 6A cable, and a category 7 cable.

The PSE includes a first data transceiver U1, a first capacitor C1, a second capacitor C2, a direct current voltage source, and a first Ethernet interface E1. The first Ethernet interface E1 includes a first positive polarity pin D1+ and a first negative polarity pin D1−. The first data transceiver U1 is mainly configured to send a modulated data signal to the powered device, and demodulate a data signal from the powered device. The direct current voltage source Vpse is configured to provide a direct current voltage. The first data transceiver U1 may be a physical layer chip. A positive electrode of the direct current voltage source Vpse is connected to the first positive polarity pin D1+ of the first Ethernet interface E1, and is connected to the first data transceiver U1 using the first capacitor C1. A negative electrode of the direct current voltage source Vpse is connected to the first negative polarity pin D1− of the first Ethernet interface E1, and is connected to the first data transceiver U1 using the second capacitor C2. Further, the PSE further includes a first ferrite bead T1. Two conducting wires led out from the positive electrode and the negative electrode of the direct current voltage source Vpse pass through the first ferrite bead T1. The first ferrite bead T1 is configured to suppress an alternating current voltage generated by the direct current voltage source, to reduce interference of the alternating current voltage.

It may be learned from the structure of the PSE that the data signal is an alternating current signal, and a power signal is a direct current signal, and therefore the PSE isolates the data signal from the power signal using a direct current blocking function of the first capacitor C1 and the second capacitor C2. In this way, both the data signal and the power signal are transmitted on the one pair of cables.

The powered device includes a data transceiver U2, a third capacitor C3, a fourth capacitor C4, a second load Rload, and a second Ethernet interface E2. The second data transceiver U2 is mainly configured to send a modulated data signal to the PSE, and receive a data signal from the PSE. The second data transceiver U2 may be a physical layer chip. The second load is a working load of the powered device. The second load may be one or more of a capacitive load, an inductive load, and a resistive load, and the second load Rload is configured to consume electric energy of the PSE. The second Ethernet interface E2 includes a second positive polarity pin D2+ and a second negative polarity pin D2−. The first Ethernet interface E1 matches the second Ethernet interface E2. For example, the first Ethernet interface E1 is an RJ45 connector, and the second Ethernet interface E2 is an RJ45 socket. Alternatively, the first Ethernet interface E1 is an RJ45 socket, and the second Ethernet interface E2 is an RJ45 socket. When the first Ethernet interface E1 is connected to the second Ethernet interface E2 using a twisted pair, the first positive polarity pin D1+ of the first Ethernet interface E1 is connected to the second positive polarity pin D2+ of the second Ethernet interface E2, and the first negative polarity pin D1− of the first Ethernet interface E1 is connected to the second negative polarity pin D2− of the second Ethernet interface E2 such that the PSE supplies power to the powered device using the one pair of cables.

A connection relationship between the components in the powered device includes that one end of the second load Rload is connected to the second positive polarity pin D2+ of the second Ethernet interface E2, and is connected to the second data transceiver U2 using the third capacitor C3. The other end of the second load Rload is connected to the second negative polarity pin D2− of the second Ethernet interface E2, and is connected to the second data transceiver U2 using the fourth capacitor. Further, the powered device further includes a second ferrite bead T2. Two conducting wires led out from the two ends of the second load Rload pass through the second ferrite bead T2. The second ferrite bead T1 is configured to suppress an alternating current voltage loaded to the second load Rload, to reduce interference caused by the alternating current voltage to the second load Rlaod.

It may be learned from the structure of the powered device that the data signal is an alternating current signal, and a power signal is a direct current signal, and therefore the powered device isolates the data signal from the power signal using a direct current blocking function of the third capacitor C3 and the fourth capacitor C4. In this way, both the data signal and the power signal are transmitted on the one pair of cables.

The powered device is a device that supports power over Ethernet. For example, the powered device may be a Voice over IP (VoIP) phone, a wireless base station, a hub, a network camera, or a computer.

Different powered devices may need to work with different power. Therefore, before providing a working voltage for the powered device, the PSE may detect a power level of the powered device, to determine power required by the powered device. Based on the structure of the single-pair power over Ethernet system in FIG. 2, a method for detecting, by the PSE, the power level of the powered device using an SCCP includes When the first Ethernet interface E1 connected to the powered device using the second Ethernet interface E2 is detected, the PSE loads a detection voltage on the first positive polarity pin D1+ and the first negative polarity pin D1− of the first Ethernet interface E1. The detection voltage is less than a voltage for normal power supply. For example, the detection voltage is 4 V. The PSE detects whether a detection current between the first positive polarity pin D1+ and the first negative polarity pin D1− falls within a preset range. If the detection current falls within the preset range, it is determined that the connected powered device is a device that supports power over Ethernet. Then, the first data transceiver U1 of the PSE sends, to the second data transceiver U2 using the one pair of cables (the first positive polarity pin D1+ and the first negative polarity pin D1−), a request message used to query the power level. After receiving the request message, the second data transceiver U2 obtains power level information prestored in a memory, and sends, to the first data transceiver U1, a response message that carries the power level information such that the PSE learns the power level of the powered device based on the response message.

It may be learned from the method for detecting the power level of the powered device that the PSE learns the power level of the powered device by sending the request message and receiving the response message. A plurality of clock cycles are required to modulate and demodulate the request message and the response message, to transmit the messages in the twisted pair, and to transmit the messages. Therefore, a time for detecting the power level by the PSE is greatly increased. It usually takes hundreds of milliseconds to detect the power level, and consequently a requirement for fast power supply cannot be met.

To resolve a current problem that it takes an excessively long time to detect a power level of a powered device, an embodiment of the present disclosure provides a single-pair power over Ethernet system in FIG. 3A to FIG. 5.

Figure 3A:
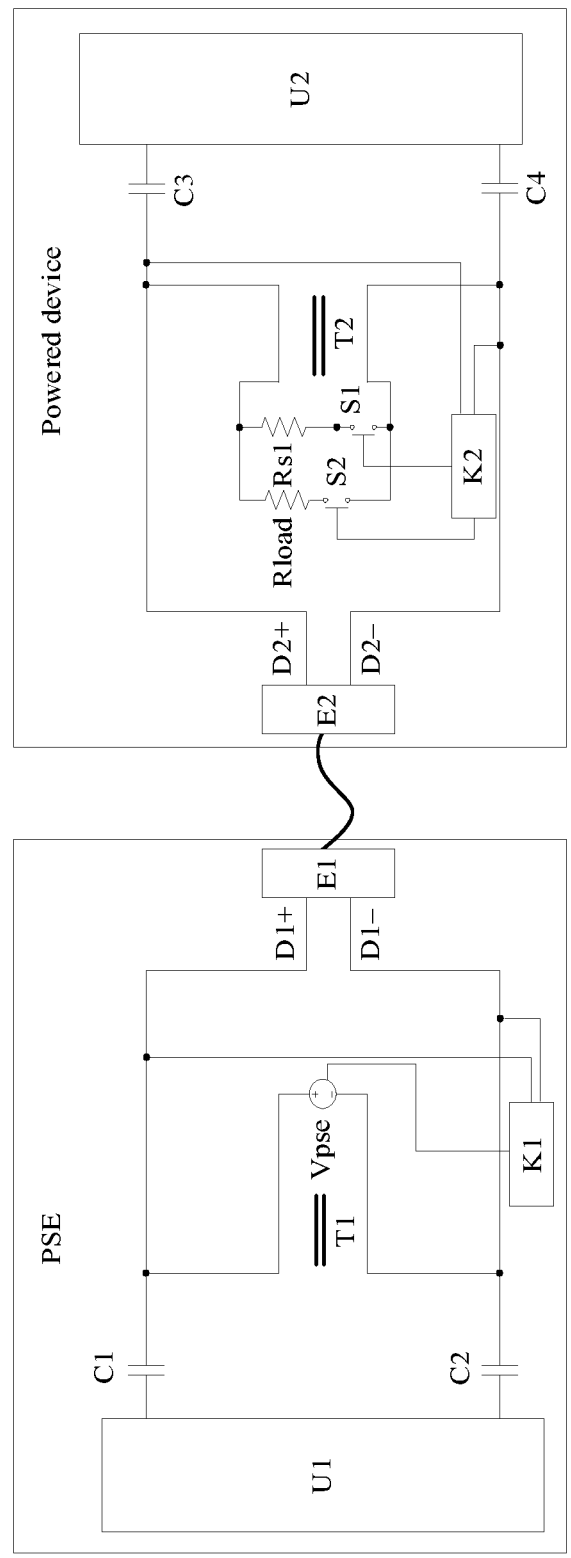
FIG. 3A is another schematic structural diagram of a single-pair power over Ethernet system according to an embodiment of the present disclosure.

FIG. 3A is another schematic structural diagram of a single-pair power over Ethernet system according to an embodiment of the present disclosure. A difference between PSE in this embodiment of the present disclosure and the PSE in FIG. 2 lies in that the PSE further includes a first controller. For example, as shown in FIG. 3A, the first controller includes a control unit K1. A first port of the control unit K1 is connected to a direct current voltage source Vpse, a second port of the first controller K1 is connected to a first positive polarity pin D1+ of a first Ethernet interface E1, and a third port of the first controller is connected to a first negative polarity pin D1− of the first Ethernet interface E1.

A difference between a powered device in this embodiment and the powered device in FIG. 2 lies in that the powered device further includes a second controller and one or more first loads. For example, as shown in FIG. 2, the second controller includes a control unit K2, a first controlled switch S1 and a second controlled switch S2. There is one first load, and the first load is a load Rs1 in FIG. 2.

The first load Rs1 is connected to the first controlled switch S1 in series, and then is bridged between a second positive polarity pin D2+ and a second negative polarity pin D2− of a second Ethernet interface E2. A second load Rload is connected to the second controlled switch S2 in series, and then is bridged between the second positive polarity pin D2+ and the second negative polarity pin D2− of the second Ethernet interface E2. The second positive polarity pin D2+ is connected to a second port of a second data transceiver U2 using a third capacitor C3, and the second negative polarity pin D2− is connected to the second port of the second data transceiver U2 using a fourth capacitor C4.

The first load and the second load in this embodiment of the present disclosure may be inductive loads, capacitive loads, resistive loads, or a combination of the foregoing three load types. This is not limited in this application. For example, the first load includes one or more of a resistor, a capacitor, an inductor, a field-effect transistor, and a transistor.

The controlled switch in this embodiment of the present disclosure is configured to control a branch circuit in which the controlled switch is located to be in a connected state or a disconnected state. The controlled switch (the first controlled switch and the second controlled switch) includes but is not limited to a relay, a transistor, a field-effect transistor, or a switch in another form.

The first controller and the second controller may be components or chips, such as powered device chips, that control a connected state and a disconnected state of the first load and the second load, or may be circuit apparatuses including a plurality of components. In a possible implementation, the second controller includes a control unit and a controlled switch. The control unit is a chip that controls the controlled switch to be open or closed. A structure of the second controller of the powered device is not limited to the foregoing form of a chip or a chip+ a controlled switch, and may alternatively be another structure. This is not limited in this embodiment of the present disclosure.

Figure 3B:
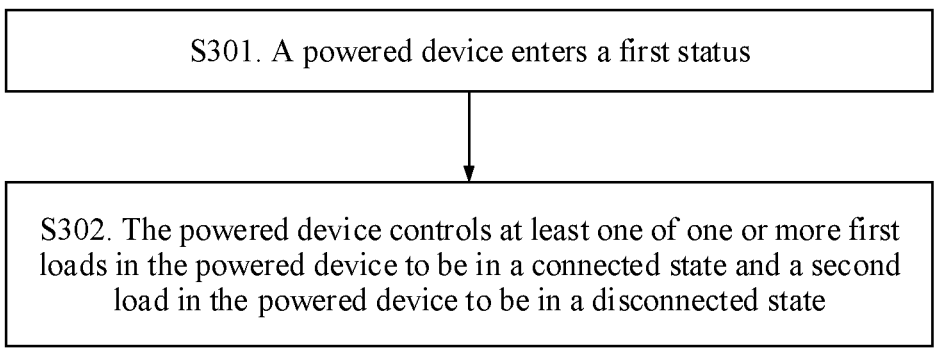
FIG. 3B is a schematic flowchart of a control method according to an embodiment of the present disclosure.

FIG. 3B is a schematic flowchart of a power level control method according to an embodiment of the present disclosure. The control method is based on the system architecture in FIG. 3A. The method includes the following steps.

S301. A powered device enters a first status.

A first controller controls the powered device to enter the first status. The first status indicates a status of detecting a power level of the powered device. In a possible implementation, the first status is a power level detection state. The first status corresponds to a time interval. A reference moment of the time interval may be a moment at which the powered device is connected to PSE, and the moment is used as a zero moment.

In a possible implementation, before the powered device enters the first status, the method further includes the following.

When the powered device detects that a first condition is met, it is determined, based on a detection result, that a current status is the first status. The first condition is a condition for entering the first status. The condition may be obtained by combining one or more sub-connections using different logical relationships.

The first condition may be any one of the following:

a. A voltage output by the PSE to the powered device is greater than or equal to a first voltage threshold.

The first voltage threshold is a voltage threshold prestored in the powered device or a preconfigured voltage threshold, and the first voltage threshold may be set based on a requirement. For example, as shown in FIG. 3A, the first voltage threshold is 15 volts (V), the voltage from the PSE to the powered device is output to the powered device using a network cable, and a control unit K2 of the powered device detects that a voltage between a second positive polarity pin D2+ and a second negative polarity pin D2− is 16 V. Therefore, it is determined that the current status of the powered device is the first status.

b. Duration in which a voltage output by the PSE to the powered device is greater than or equal to a second voltage threshold is greater than or equal to first duration.

The second voltage threshold is a voltage threshold prestored in the powered device or a preconfigured voltage threshold, and the second voltage threshold may be set based on a requirement. The first duration is a duration threshold prestored in the powered device or a preconfigured duration threshold, and the first duration may be set based on a requirement. For example, as shown in FIG. 3A, the second voltage threshold is 20 V, the first duration is 1 ms, and a control unit K2 of the powered device detects that duration in which a voltage between a second positive polarity pin D2+ and a second negative polarity pin D2− is 25 V is 1.5 ms. Therefore, it is determined that the powered device enters the first status.

c. A voltage output by the PSE to the powered device falls within a first voltage range.

The first voltage range is a voltage interval, and the first voltage range may be a voltage interval prestored in the powered device or a preconfigured voltage interval. The first voltage range may be obtained by fluctuating above or below a reference voltage. For example, as shown in FIG. 3A, the reference voltage is 15 V, the first voltage range is obtained by fluctuating above or below 15 V by 10%, and a control unit K2 of the powered device detects that a voltage between a second positive polarity pin D2+ and a second negative polarity pin D2− is 15.1 V. The voltage falls within the first voltage range, and therefore it is determined that the powered device enters the first status.

d. Duration in which a voltage output by the PSE to the powered device falls within a second voltage range is greater than or equal to second duration.

The second voltage range is a voltage interval, and the second voltage range may be a voltage interval prestored in the powered device or a preconfigured voltage interval. The second voltage range may be obtained by fluctuating above or below a reference voltage. The second duration is a time length prestored in the powered device or a preconfigured time length. For example, as shown in FIG. 3A, the second voltage range is obtained by fluctuating above or below the reference voltage 20 V by 20%, that is, the second voltage range is [16 V, 24 V], the second duration is 2 ms, and a control unit K2 of the powered device detects that duration in which a voltage between a second positive polarity pin D2+ and a second negative polarity pin D2− is 19 V is 3 ms. Therefore, it is determined that the powered device enters the first status.

e. A current output by the PSE to the powered device is greater than or equal to a first current threshold.

The first current threshold may be a current threshold prestored in the powered device or a preconfigured current threshold, and the first current threshold may be set based on a requirement. For example, as shown in FIG. 3A, the first current threshold is 5 milliamperes (mA), and a control unit K2 of the PSE detects that a current between a second positive polarity pin D2+ and a second negative polarity pin D2− is 6 mA. Therefore, it is determined that the powered device enters the first status.

f. Duration in which a current output by the PSE to the powered device is greater than or equal to a second current threshold is greater than or equal to third duration.

The second current threshold is a current threshold prestored in the powered device or a preconfigured current threshold, and the second current threshold may be set based on a requirement. The third duration is a duration threshold prestored in the powered device or a preconfigured duration threshold, and the third duration may be set based on a requirement. For example, as shown in FIG. 3A, the second current threshold is 15 mA, the third duration is 2 ms, and a control unit K2 of the powered device detects that duration in which a current between a second positive polarity pin D2+ and a second negative polarity pin D2− is 20 mA is 5 ms. Therefore, it is determined that the powered device enters the first status.

g. A current output by the PSE to the powered device falls within a first current range.

The first current range is a current interval, and the first current range may be a current interval prestored in the powered device or a preconfigured current interval. The first current range may be obtained by fluctuating above or below a reference current. For example, as shown in FIG. 3A, the reference current is 20 mA, the first current range is obtained by fluctuating above or below 20 mA by 10%, that is, the first current range is [18 mA, 22 mA], and a control unit K2 of the powered device detects that a current between a second positive polarity pin D2+ and a second negative polarity pin D2− is 19 mA. The current falls within the first current range, and therefore it is determined that the powered device enters the first status.

h. Duration in which a current output by the PSE to the powered device falls within a second current range is greater than or equal to fourth duration.

The second current range is a current interval, and the second current range may be a current interval prestored in the powered device or a preconfigured current interval. The second current range may be obtained by fluctuating above or below a reference current. The fourth duration is a time length prestored in the powered device or a preconfigured time length. For example, as shown in FIG. 3A, the second current range is obtained by fluctuating above or below the reference voltage 20 mA by 20%, that is, the second voltage range is [16 mA, 24 mA], the fourth duration is 3 ms, and a control unit K2 of the powered device detects that duration in which a voltage between a second positive polarity pin D2+ and a second negative polarity pin D2− is 19 mA is 4 ms. Therefore, it is determined that the powered device enters the first status.

i. Duration in which the powered device is in the first status is greater than or equal to fifth duration.

The fifth duration is duration prestored in the powered device or preconfigured duration. A reference time point of the powered device may be the moment at which the powered device is electrically connected to the PSE. Timing is started using the moment as the zero moment.

k. The powered device receives an indication signal sent by the PSE, where the indication signal is used to instruct the powered device to enter the first status.

The indication signal is a signal with a specific signal feature. The signal feature includes one or more of an amplitude, a phase, and a period. The indication signal may be a square wave, a sine wave, or a triangular wave. For example, the indication signal is a square wave signal with an amplitude of 5 V and a period of 1 second (s). Alternatively, the powered device receives an indication signal sent by another device, and is not limited to receiving the indication signal from the PSE. This is not limited in the present disclosure.

S302. The powered device controls at least one of one or more first loads in the powered device to be in a connected state and a second load in the powered device to be in a disconnected state.

Further, the first load and the second load are loads that consume electric energy in a circuit. The first load and the second load may be one or more of inductive loads, capacitive loads, and resistive loads. The first load is configured to detect the power level of the powered device, and the second load is a working load of the powered device. In a possible implementation, the first load is a characteristic resistor. As described in this embodiment of the present disclosure, the connected state indicates a status in which the load is connected to the circuit to consume the electric energy of the PSE, and the disconnected state indicates a status in which the load is not connected to the circuit to consume the electric energy of the PSE. For example, as shown in FIG. 3A, the powered device includes a first load Rs1 and a second load Rload. When detecting that the powered device enters the first status, the control unit K2 instructs a first controlled switch S1 to be in a closed state and the first load Rs1 to be in the connected state, and instructs a second controlled switch S2 to be in an open state and the second load Rload to be in the disconnected state. When the at least one load is in the connected state, a voltage output by the PSE is loaded to the at least one load to form a current, and the PSE may determine the power level of the powered device by detecting intensity of the current. In this way, the power level of the powered device is detected by hardware, and the power level of the powered device does not need to be learned through message exchange. Therefore, a time consumed for modulation and demodulation in a message transmission process is avoided, and a time for determining the power level of the powered device is greatly reduced.

Figure 3C:
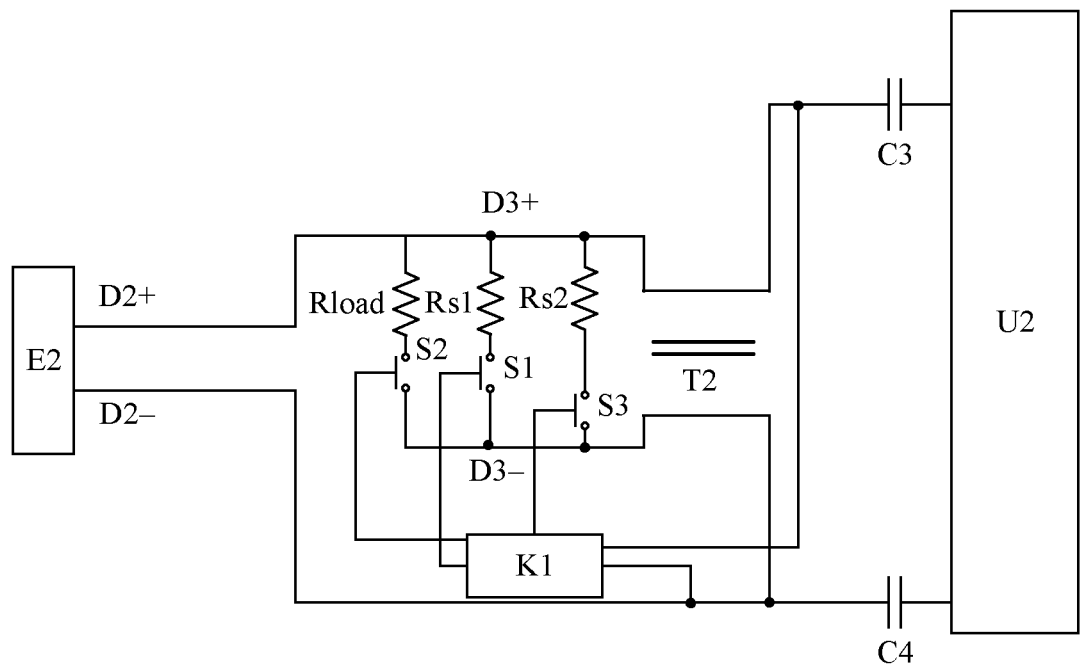
FIG. 3C is a schematic structural diagram of a powered device according to an embodiment of the present disclosure.

That at least one of one or more first loads is in a connected state indicates that a quantity of first loads in the connected state in the powered device is less than or equal to a total quantity of first loads. A connection relationship between the one or more first loads is not limited in this embodiment of the present disclosure, and may be a series connection, a parallel connection, or a hybrid connection. For example, as shown in FIG. 3C, the powered device includes two first loads: a first load Rs1 and a first load Rs2 that are connected in parallel. When the powered device enters the first status, the first load Rs1 is controlled to be in the connected state, the first load Rs2 is controlled to be in the disconnected state, and the second load Rload is controlled to be in the disconnected state. For another example, when the powered device enters the first status, the first load Rs1 is controlled to be in the connected state, the first load Rs2 is controlled to be in the connected state, and the second load Rload is controlled to be in the disconnected state.

In a possible implementation, in the first status, the powered device may control the at least one first load to be in the connected state or the disconnected state for a plurality of times. For example, the powered device includes a first load Rs1, a first load Rs2, a first load Rs3, and a first load Rs4. In the first status, the powered device first controls the first load Rs1 to be in the connected state and the second load Rload to be in the disconnected state. Then, the powered device controls the first load Rs2 to be in the connected state. In this case, the first load Rs1 is still in the connected state, and the second load Rload is still in the disconnected state. Finally, the powered device controls the first loads Rs3 and Rs4 to be in the connected state, and controls the first load Rs1 to be in the disconnected state. In this case, the first load Rs2 is still in the connected state, and the second load Rload is still in the disconnected state. A sequence and a quantity of first loads controlled by the powered device to be in the connected state or the disconnected state for a plurality of times may be set based on a requirement. The foregoing is merely an example for description, and constitutes no limitation on this embodiment of the present disclosure. A quantity of power levels of the powered device can be increased in a manner of controlling the first load to be in the connected state for a plurality of times such that a voltage of a finer granularity is output.

In a possible implementation, in all of a time in which the at least one first load is in the connected state, the second load is in the disconnected state. All of the time indicates a time interval in which the first load is in the connected state. For example, if the time interval in which the at least one first load is in the connected state is [t0, t0+5 ms], the second load is in the disconnected state in the time interval [t0, t0+5 ms].

In another possible implementation, in a part of a time in which the at least one first load is in the connected state, the second load is in the disconnected state. All of the time in which the at least one first load is in the connected state is a time interval, and the part of the time is a continuous time interval in all of the time. A length and a location of the part of the time may be set based on a requirement. This is not limited in this embodiment of the present disclosure. For example, if the time interval in which the at least one first load is in the connected state is [t0, t0+5 ms], the second load is in the connected state in a time interval [t0, t0+0.5 ms], and the second load is in the disconnected state in a time interval (t0+0.5 ms, t0+5 ms].

The PSE prestores or preconfigures a mapping relationship between a current range and a power level. The mapping relationship is shown in Table 1.

TABLE 1

| Level | Characteristic current | Output power |
|---|---|---|
| 0 | 0-5 mA | 15.4 watts (W) |
| 1 | 8-13 mA | 4.0 W |
| 2 | 16-21 mA | 7.0 W |
| 3 | 25-31 mA | 15.4 W |

The PSE in FIG. 3A is used as an example. It is assumed that the PSE detects that a current between a first positive polarity pin D1+ and a first negative polarity pin D1− of a first Ethernet interface E1 is 10 mA. The current falls within a voltage range of 8-13 mA, a power level corresponding to the voltage range is 1, and output power corresponding to the power level is 4.0 W. A control unit K1 of the PSE instructs a direct current voltage source Vpse to adjust an output voltage such that the PSE provides a required voltage or current of 4.0 W for the powered device using the pin D1+ and the pin D1− of the first Ethernet interface E1.

In a possible implementation, the method further includes the following. The powered device enters a second status. In the second status, the second load is in the connected state. The second status may be a normal power supply state or a detection state. Duration of the second status may be set based on a requirement. This is not limited in this embodiment of the present disclosure. For example, referring to the description in FIG. 3A, when a second controller determines that the powered device enters the second status, in the second status, the control unit K2 instructs a second controlled switch to be in the closed state, to control the second load Rload to be in the connected state.

Further, the powered device enters the second status. In the second status, the powered device controls the second load to be in the connected state, and controls the one or more first loads to be in the disconnected state. The one or more first loads are all first loads in the powered device. For example, as shown in FIG. 3A, when determining that the powered device enters the second status, the second controller instructs the first controlled switch S1 to be in the open state, and instructs the second controlled switch to be in the closed state.

Further, a second condition includes at least one of the following:

A. The voltage output by the PSE to the powered device is greater than or equal to a third voltage threshold.

The third voltage threshold is different from the first voltage threshold, the third voltage threshold is a voltage threshold prestored in the powered device or a preconfigured voltage threshold, and the third voltage threshold may be set based on a requirement. For example, as shown in FIG. 3A, the third voltage threshold is 40 V, the voltage from the PSE to the powered device is output to the powered device through the network cable, and the control unit K2 of the powered device detects that the voltage between the second positive polarity pin D2+ and the second negative polarity pin D2− is 50 V. Therefore, it is determined that the current status of the powered device is the second status.

B. Duration in which the voltage output by the PSE to the powered device is greater than or equal to a fourth voltage threshold is greater than or equal to sixth duration.

The fourth voltage threshold is different from the second voltage threshold. The fourth voltage threshold is a voltage threshold prestored in the powered device or a preconfigured voltage threshold, and the fourth voltage threshold may be set based on a requirement. The sixth duration is a duration threshold prestored in the powered device or a preconfigured duration threshold, and the sixth duration may be set based on a requirement. For example, as shown in FIG. 3A, the fourth voltage threshold is 5 V, the sixth duration is 1 ms, and the control unit K2 of the powered device detects that duration in which the voltage between the second positive polarity pin D2+ and the second negative polarity pin D2− is 6 V is 1.5 ms. Therefore, it is determined that the powered device enters the second status.

C. The voltage output by the PSE to the powered device falls within a third voltage range.

The third voltage range is different from the first voltage range, and the third voltage range does not overlap the first voltage range. The third voltage range is a voltage interval, and the third voltage range may be a voltage interval prestored in the powered device or a preconfigured voltage interval. The third voltage range may be obtained by fluctuating above or below a reference voltage. For example, as shown in FIG. 3A, the reference voltage is 5 V, the third voltage range is obtained by fluctuating above or below 5 V by 10%, and the control unit K2 of the powered device detects that the voltage between the second positive polarity pin D2+ and the second negative polarity pin D2− is 5.1 V. The voltage falls within the third voltage range, and therefore it is determined that the powered device enters the second status.

D. Duration in which the voltage output by the PSE to the powered device falls within a fourth voltage range is greater than or equal to seventh duration.

The fourth voltage range is different from the second voltage range, and the fourth voltage range does not overlap the second voltage range. The fourth voltage range is a voltage interval, and the fourth voltage range may be a voltage interval prestored in the powered device or a preconfigured voltage interval. The fourth voltage range may be obtained by fluctuating above or below a reference voltage. The seventh duration is a time length prestored in the powered device or a preconfigured time length. For example, as shown in FIG. 3A, the fourth voltage range is obtained by fluctuating above or below the reference voltage 10 V by 20%, that is, the second voltage range is [8 V, 12 V], the second duration is 2 ms, and the control unit K2 of the powered device detects that duration in which the voltage between the second positive polarity pin D2+ and the second negative polarity pin D2− is 11 V is 3 ms. Therefore, it is determined that the powered device enters the second status.

E. The current output by the PSE to the powered device is greater than or equal to a third current threshold.

The third current threshold is different from the first current threshold. The third current threshold may be a current threshold prestored in the powered device or a preconfigured current threshold, and the third current threshold may be set based on a requirement. For example, as shown in FIG. 3A, the first current threshold is 10 mA, and the control unit K2 of the PSE detects that the current between the second positive polarity pin D2+ and the second negative polarity pin D2− is 12 mA. Therefore, it is determined that the powered device enters the second status.

F. Duration in which the current output by the PSE to the powered device is greater than or equal to a fourth current threshold is greater than or equal to eighth duration.

The fourth current threshold is different from the second circuit threshold. The fourth current threshold is a current threshold prestored in the powered device or a preconfigured current threshold, and the fourth current threshold may be set based on a requirement. The eighth duration is a duration threshold prestored in the powered device or a preconfigured duration threshold, and the eighth duration may be set based on a requirement. For example, as shown in FIG. 3A, the fourth current threshold is 50 mA, the third duration is 2 ms, and the control unit K2 of the powered device detects that duration in which the current between the second positive polarity pin D2+ and the second negative polarity pin D2− is 60 mA is 5 ms. Therefore, it is determined that the powered device enters the second status.

G. The current output by the PSE to the powered device falls within a third current range.

The third current range is different from the first current range, and the third current range does not overlap the first current range. The third current range is a current interval, and the third current range may be a current interval prestored in the powered device or a preconfigured current interval. The third current range may be obtained by fluctuating above or below a reference current. For example, as shown in FIG. 3A, the reference current is 2 mA, the first current range is obtained by fluctuating above or below 2 mA by 10%, that is, the third current range is [1.8 mA, 2.2 mA], and the control unit K2 of the powered device detects that the current between the second positive polarity pin D2+ and the second negative polarity pin D2− is 1.9 mA. The current falls within the third current range, and therefore it is determined that the powered device enters the second status.

H. Duration in which the current output by the PSE to the powered device falls within a fourth current range is greater than or equal to ninth duration.

The fourth current range is different from the second current range, and the fourth current range does not overlap the second current range. The fourth current range is a current interval, and the fourth current range may be a current interval prestored in the powered device or a preconfigured current interval. The fourth current range may be obtained by fluctuating above or below a reference current. The ninth duration is a time length prestored in the powered device or a preconfigured time length. For example, as shown in FIG. 3A, the fourth current range is obtained by fluctuating above or below the reference current 2 mA by 20%, that is, the second voltage range is [1.6 mA, 2.4 mA], the ninth duration is 3 ms, and the control unit K2 of the powered device detects that duration in which the voltage between the second positive polarity pin D2+ and the second negative polarity pin D2− is 1.9 mA is 4 ms. Therefore, it is determined that the powered device enters the second status.

I. The duration in which the powered device is in the second status is greater than or equal to tenth duration.

The tenth duration is duration prestored in the powered device or preconfigured duration. The reference time point of the powered device may be the moment at which the powered device is electrically connected to the PSE. Timing is started using the moment as the zero moment.

J. An indication signal sent by the PSE is received, where the indication signal is used to instruct the powered device to enter the second status. Alternatively, the powered device receives an indication signal sent by another device, and is not limited to receiving the indication signal from the PSE. This is not limited in the present disclosure.

The indication signal is a signal with a specific signal feature. The signal feature includes one or more of an amplitude, a phase, and a period. For example, the indication signal is a square wave signal with an amplitude of 5 V and a period of 1 s.

In another possible implementation, the second condition includes at least one of the following The voltage output by the PSE to the powered device is less than the first voltage threshold, the voltage output by the PSE to the powered device does not meet the following condition, where the duration in which the voltage is greater than or equal to the second voltage threshold is greater than or equal to the first duration, the voltage output by the PSE to the powered device falls outside the first voltage range, the voltage output by the PSE to the powered device does not meet the following condition, where the duration in which the voltage falls within the second voltage range is greater than or equal to the second duration, the current output by the PSE to the powered device is less than the first current threshold, the current output by the PSE to the powered device does not meet the following condition, where the duration in which the current is greater than or equal to the second current threshold is greater than or equal to the third duration, the current output by the PSE to the powered device falls outside the first current range, the current output by the PSE to the powered device does not meet the following condition, where the duration in which the current falls within the second current range is greater than or equal to the fourth duration, or the duration in which the powered device is in the first status is less than the fifth duration.

In this embodiment, the second condition is contrary to the first condition. For a specific implementation process, refer to the description of the first condition. Details are not described herein again.

Figure 4:
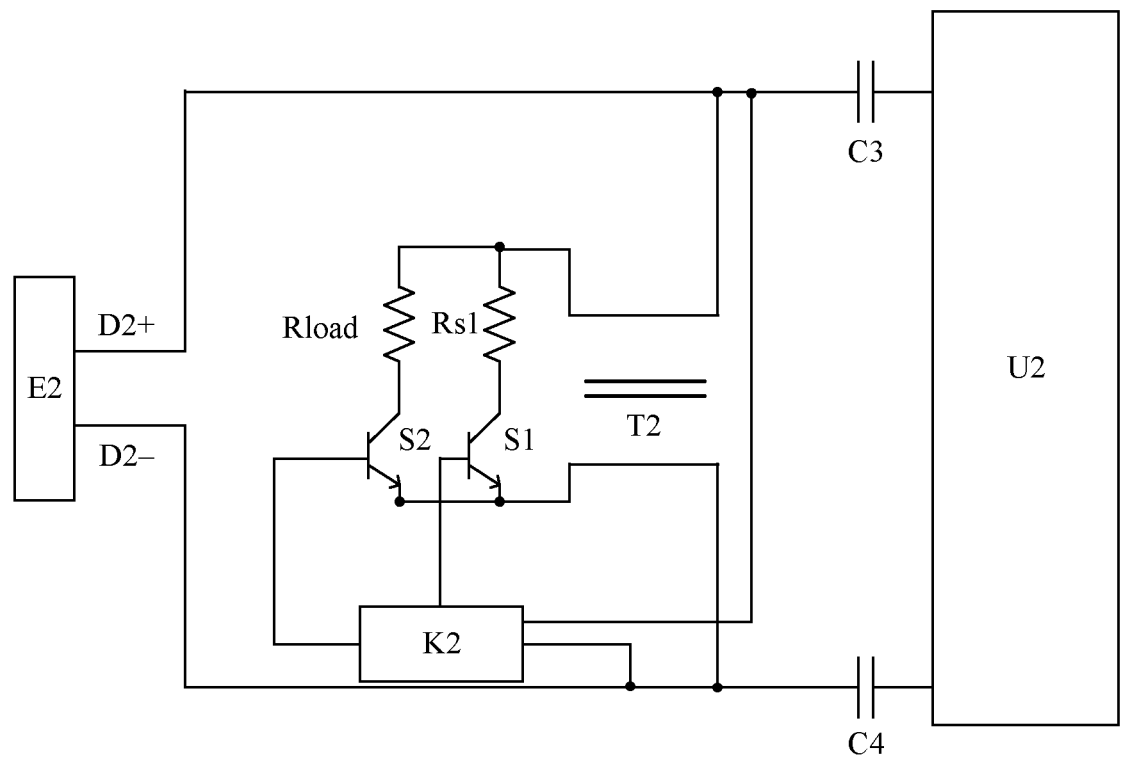
FIG. 4 is another schematic structural diagram of a powered device according to an embodiment of the present disclosure.

In a possible implementation, the controlled switch in the second controller is a transistor. When there is a plurality of controlled switches in the second controller, the plurality of controlled switches may be of a same type or different types. As shown in FIG. 4, the second controller includes a first controlled switch S1, a second controlled switch S2, and a control unit K2. Both the first controlled switch S1 and the second controlled switch S2 are transistors, and a connected state and a disconnected state of a first load Rs1 and a second load Rload are controlled using conduction and cut-off functions of the transistors.

Figure 5:
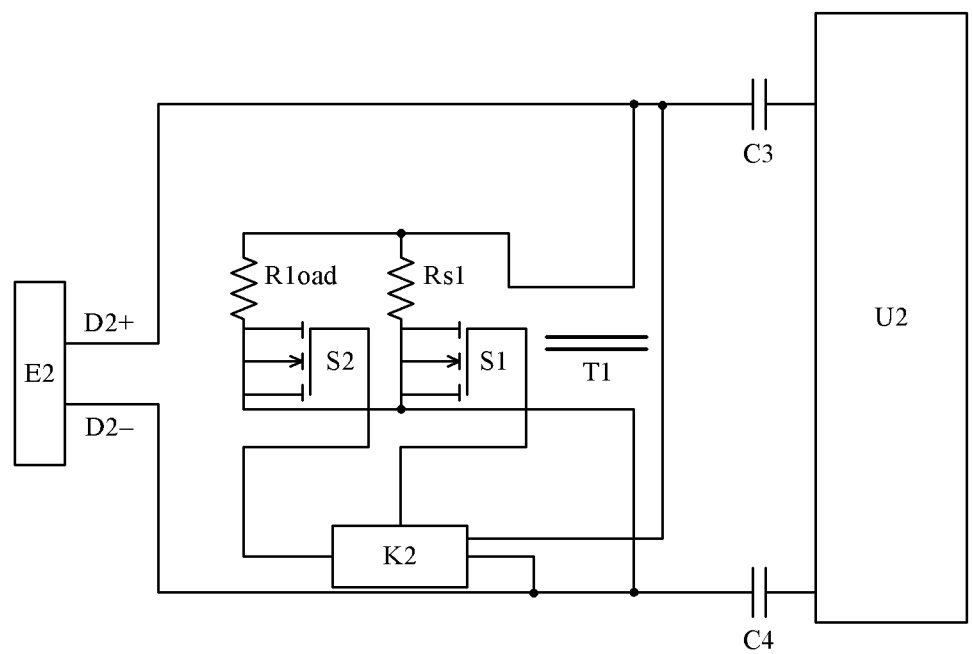
FIG. 5 is another schematic structural diagram of a powered device according to an embodiment of the present disclosure.

In a possible implementation, the controlled switch in the second controller is a metal-oxide-semiconductor field-effect transistor (MOSFET). When there is a plurality of controlled switches in the second controller, the plurality of controlled switches may be of a same type or different types. As shown in FIG. 5, the second controller includes a first controlled switch S1, a second controlled switch S2, and a control unit K2. Both the first controlled switch S1 and the second controlled switch S2 are MOSFETs, and a connected state and a disconnected state of a first load Rs1 and a second load Rload are controlled using conduction and cut-off functions of the transistors.

It may be learned from the foregoing description that in this embodiment of the present disclosure, the power level of the powered device is detected by hardware. In comparison with a manner of detecting a power level using a request message and a response message, neither message modulation and demodulation nor a message transmission process is required. In this way, a time for detecting the power level of the powered device is greatly reduced.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A powered device comprising:
    a plurality of first loads configured to detect a power level of the powered device in a first status;
    a plurality of first switches respectively coupled to the plurality of first loads in series;
    a second load configured as a working load of the powered device in a second status;
    a second switch coupled to the second load in series; and
    a controller coupled to the plurality of first switches and the second switch and configured to control, in the first status, part of the plurality of first switches to be in a closed state and the second switch to be in an open state to enable part of the plurality of first loads to be in a connected state and the second load to be in a disconnected state.

2. The powered device of claim 1, wherein the plurality of first loads are hierarchical loads.

3. The powered device of claim 1, wherein the controller is further configured to control different parts of the plurality of the first switches to be in a closed state for different times in the first status.

4. The powered device of claim 1, wherein the controller is further configured to:
    obtain a first detection result that a first condition is met; and
    determine, based on the first detection result, that a current status is the first status.

5. The powered device of claim 4, wherein the first condition comprises at least one of the following:
    a first voltage output by a power sourcing equipment (PSE) to the powered device is greater than or equal to a first voltage threshold;
    a first duration in which the first voltage is greater than or equal to a second voltage threshold is greater than or equal to a second duration;
    the first voltage falls within a first voltage range;
    a third duration in which the first voltage falls within a second voltage range is greater than or equal to a fourth duration;
    a first current output by the PSE to the powered device is greater than or equal to a first current threshold;
    a fifth duration in which the first current is greater than or equal to a second current threshold is greater than or equal to a sixth duration;
    the first current falls within a first current range;
    a seventh duration in which the first current falls within a second current range is greater than or equal to an eighth duration;
    a ninth duration in which the powered device is in the first status is greater than or equal to a tenth duration; or
    receive, from the PSE, a first indication signal instructing the powered device to enter the first status.

6. The powered device of claim 1, wherein the controller is further configured to control, in the second status, the plurality of first switches to be in an open state and the second switch to be in a closed state to enable the second load is in the connected state and the plurality of first loads to be in the disconnected state.

7. The powered device of claim 6, wherein the controller is further configured to:
    obtain a second detection result that a second condition is met; and
    determine, based on the second detection result, that a current status is the second status.

8. The powered device of claim 7, wherein the second condition comprises at least one of the following:
    a first voltage output by a power sourcing equipment (PSE) to the powered device is greater than or equal to a third voltage threshold;

an eleventh duration in which the first voltage is greater than or equal to a fourth voltage threshold is greater than or equal to a twelfth duration;

the first voltage falls within a third voltage range;

a thirteenth duration in which the first voltage falls within a fourth voltage range is greater than or equal to a fourteenth duration;

a first current output by the PSE to the powered device is greater than or equal to a third current threshold;

a fifteenth duration in which the first current is greater than or equal to a fourth current threshold is greater than or equal to a sixteenth duration;

the first current falls within a third current range;

a seventeenth duration in which the first current falls within a fourth current range is greater than or equal to an eighteenth duration;

a nineteenth duration in which the powered device is in the second status is greater than or equal to a twentieth duration; or receive, from the PSE, a second indication signal instructing the powered device to enter the second status.

9. A power over Ethernet system comprising:

a power sourcing equipment (PSE); and a powered device coupled to the PSE and comprising:
 a plurality of first loads configured to detect a power level of the powered device in a first status;
 a plurality of first switches respectively coupled to the plurality of first loads in series;
 a second load configured as a working load of the powered device in a second status;
 a second switch coupled to the second load in series; and
 a controller coupled to the plurality of first switches and the second switch and configured to control, in the first status, part of the plurality of first switches to be in a closed state and the second switch to be in an open state to enable part of the plurality of first loads to be in a connected state and the second load to be in a disconnected state.

10. The power over Ethernet system of claim 9, wherein the powered device further comprises:

an ethernet interface comprising a positive pole and a negative pole, wherein the plurality of first loads and the plurality of first switches are bridged between the positive pole and the negative pole, and wherein the second load and the second switch are bridged between the positive pole and the negative pole; and a data transceiver comprising a first port and a second port, wherein the positive pole is connected to the first port through a first capacitor, and wherein the negative pole is connected to the second port through a second capacitor.

11. A method implemented by a controller in a powered device, wherein the powered device comprises a plurality of first loads configured to detect a power level of the powered device in a first status and a second load configured as a working load of the powered device in a second status, wherein the plurality of first loads are respectively coupled to a plurality of first switches in series, and the second load is coupled to a second switch in series, and wherein the method comprises controlling, in the first status, part of the plurality of first switches to be in a closed state and the second switch to be in an open state to enable part of the plurality of first loads to be in a connected state and the second load to be in a disconnected state.

12. The method of claim 11, further comprising:

obtaining a first detection result that a first condition is met; and determining, based on the first detection result, that a current status is the first status.

13. The method of claim 12, wherein the first condition comprises at least one of the following:

a first voltage output by a power sourcing equipment (PSE) to the powered device is greater than or equal to a first voltage threshold;

a first duration in which the first voltage is greater than or equal to a second voltage threshold is greater than or equal to a second duration;

the first voltage falls within a first voltage range;

a third duration in which the first voltage falls within a second voltage range is greater than or equal to a fourth duration;

a first current output by the PSE to the powered device is greater than or equal to a first current threshold;

a fifth duration in which the first current is greater than or equal to a second current threshold is greater than or equal to a sixth duration;

the first current falls within a first current range;

a seventh duration in which the first current falls within a second current range is greater than or equal to an eighth duration;

a ninth duration in which the powered device is in the first status is greater than or equal to a tenth duration; or receive, from the PSE, a first indication signal instructing the powered device to enter the first status.

14. The method of claim 11, further comprising controlling, in the second status, the plurality of first switches to be in an open state and the second switch to be in a closed state to enable the second load is in the connected state and the plurality of first loads to be in the disconnected state.

15. The method of claim 14, further comprising:

obtaining a second detection result that a second condition is met; and determining, based on the second detection result, that a current status is the second status.

16. The method of claim 15, wherein the second condition comprises at least one of the following:

a first voltage output by a power sourcing equipment (PSE) to the powered device is greater than or equal to a third voltage threshold;

an eleventh duration in which the first voltage is greater than or equal to a fourth voltage threshold is greater than or equal to a twelfth duration;

the first voltage falls within a third voltage range;

a thirteenth duration in which the first voltage falls within a fourth voltage range is greater than or equal to a fourteenth duration;

a first current output by the PSE to the powered device is greater than or equal to a third current threshold;

a fifteenth duration in which the first current is greater than or equal to a fourth current threshold is greater than or equal to a sixteenth duration;

the first current falls within a third current range;

a seventeenth duration in which the first current falls within a fourth current range is greater than or equal to an eighteenth duration;

a nineteenth duration in which the powered device is in the second status is greater than or equal to a twentieth duration; or receive, from the PSE, a second indication signal instructing the powered device to enter the second status.

17. A controller coupled to a plurality of first switches and a second switch in a powered device, wherein the powered device comprises a plurality of first loads configured to detect a power level of the powered device in a first status and a second load configured as a working load of the powered device in a second status, wherein the plurality of first loads are respectively coupled to the plurality of first switches in series and the second load is coupled to a second switch in series, wherein the controller comprises:
  a memory configured to store instructions; and
  a processor coupled to the memory and configured to control, in a first status, part of the plurality of first switches to be in a closed state and the second switch to be in an open state to enable part of the plurality of first loads to be in a connected state and the second load to be in a disconnected state.

18. The controller of claim 17, wherein the processor is further configured to:
  obtain a first detection result that a first condition is met; and
  determine, based on the first detection result, that a current status is the first status.

19. The controller of claim 18, wherein the first condition comprises at least one of the following:
  a first voltage output by a power sourcing equipment (PSE) to the powered device is greater than or equal to a first voltage threshold;
  a first duration in which the first voltage is greater than or equal to a second voltage threshold is greater than or equal to a second duration;
  the first voltage falls within a first voltage range;
  a third duration in which the first voltage falls within a second voltage range is greater than or equal to a fourth duration;
  a first current output by the PSE to the powered device is greater than or equal to a first current threshold;
  a fifth duration in which the first current is greater than or equal to a second current threshold is greater than or equal to a sixth duration;
  the first current falls within a first current range;
  a seventh duration in which the first current falls within a second current range is greater than or equal to an eighth duration;
  a ninth duration in which the powered device is in the first status is greater than or equal to a tenth duration; or
  receive, from the PSE, a first indication signal instructing the powered device to enter the first status.

20. The controller of claim 17, wherein the processor is further configured to control, in the second status, the plurality of first switches to be in an open state and the second switch to be in a closed state to enable the second load is in the connected state and the plurality of first loads to be in the disconnected state.

21. The controller of claim 20, wherein the processor is further configured to:
  obtain a second detection result that a second condition is met; and
  determine, based on the second detection result, that a current status is the second status.

22. The controller of claim 21, wherein the second condition comprises at least one of the following:
  a first voltage output by a power sourcing equipment (PSE) to the powered device is greater than or equal to a third voltage threshold;
  an eleventh duration in which the first voltage is greater than or equal to a fourth voltage threshold is greater than or equal to a twelfth duration;
  the first voltage falls within a third voltage range;
  a thirteenth duration in which the first voltage falls within a fourth voltage range is greater than or equal to a fourteenth duration;
  a first current output by the PSE to the powered device is greater than or equal to a third current threshold;
  a fifteenth duration in which the first current is greater than or equal to a fourth current threshold is greater than or equal to a sixteenth duration;
  the first current falls within a third current range;
  a seventeenth duration in which the first current falls within a fourth current range is greater than or equal to an eighteenth duration;
  a nineteenth duration in which the powered device is in the second status is greater than or equal to a twentieth duration; or
  receive, from the PSE, a second indication signal instructing the powered device to enter the second status.

* * * * *